May 5, 1970 E. A. SEXTON ET AL 3,510,082
PNEUMATIC CHUCK
Filed Nov. 24, 1967 2 Sheets-Sheet 1
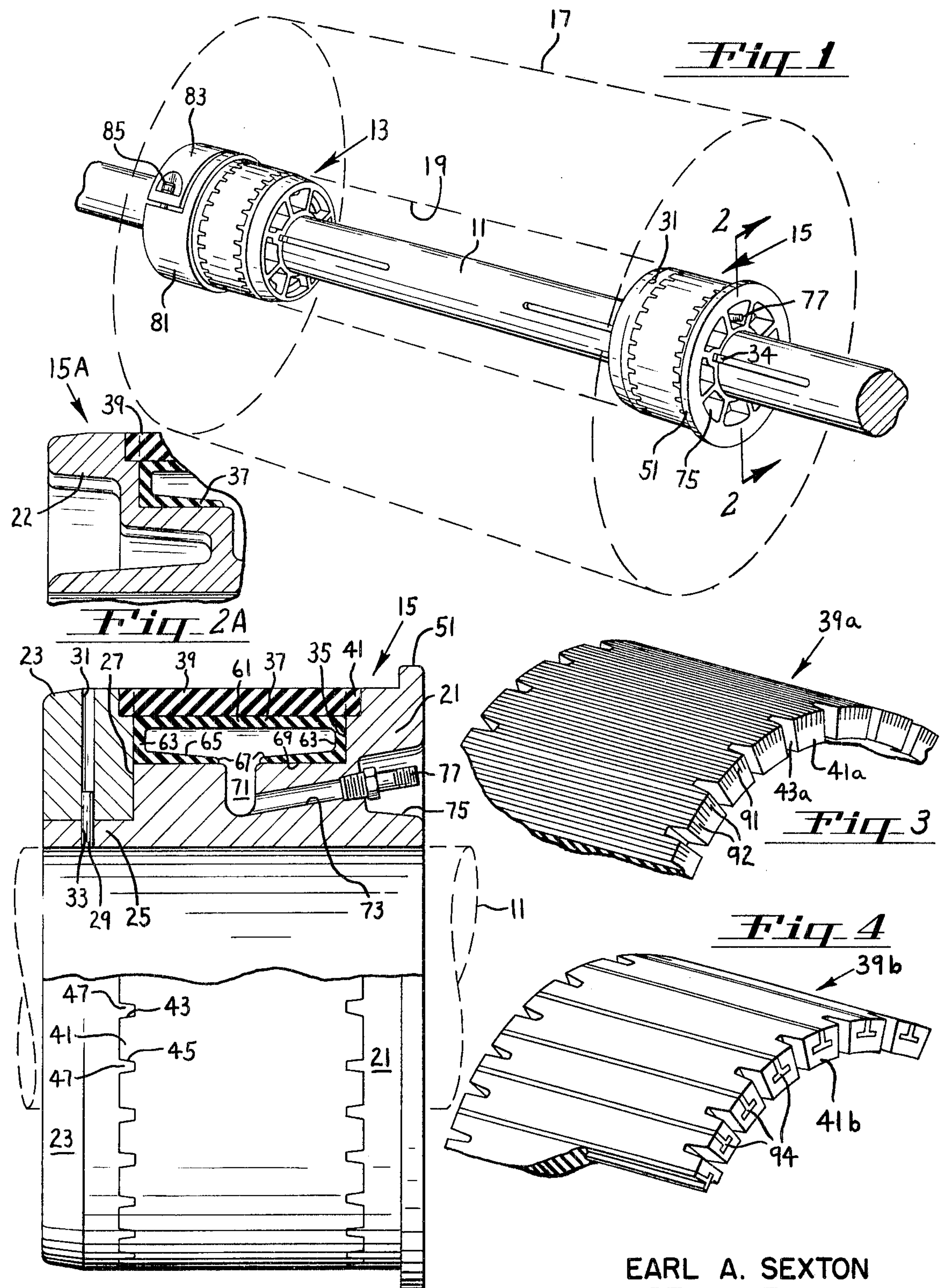
EARL A. SEXTON
ARTHUR T. WILLIAMS
INVENTORS.
BY
BUCKHORN, BLORE, KLARQUIST & SPARKMAN
ATTORNEYS PNEUMATIC CHUCK
Filed Nov. 24, 1967 2 Sheets-Sheet 2
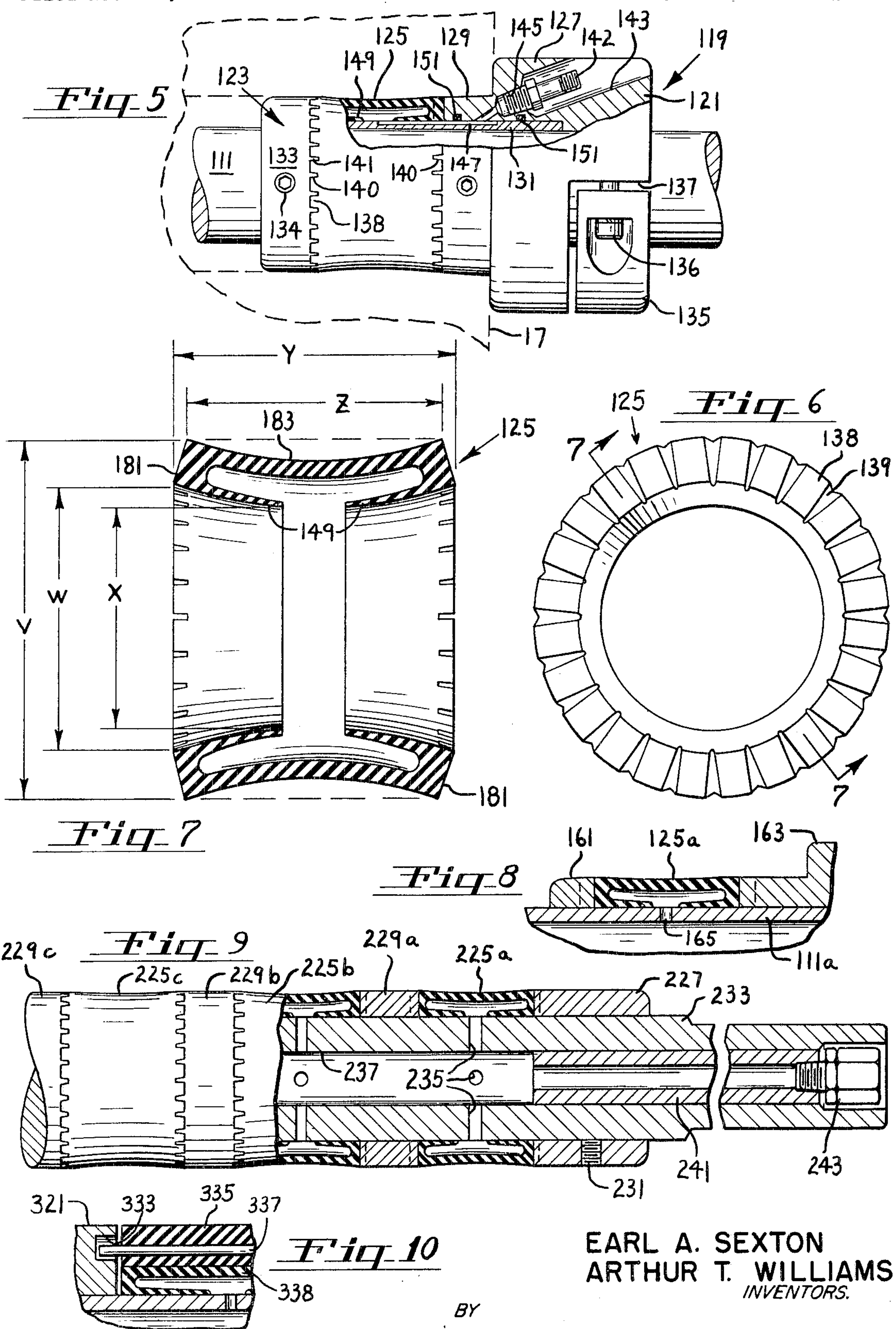
EARL A. SEXTON
ARTHUR T. WILLIAMS
INVENTORS.
BY
BUCKHORN, BLORE, KLARQUIST & SPARKMAN
ATTORNEYS United States Patent Office 3,510,082

Patented May 5, 1970

3,510,082

PNEUMATIC CHUCK

Earl A. Sexton, Gresham, Oreg., and Arthur T. Williams, 2363 SE. 8th Ave., Camas, Wash. 98607, assignors, by mesne assignments, to said Arthur T. Williams Filed Nov. 24, 1967, Ser. No. 685,439
Int. Cl. B65h 17/02
U.S. Cl. 242—68.2 12 Claims

ABSTRACT OF THE DISCLOSURE

A pneumatic chuck or shaft having an air expanded elastomer member in the form of an integral one-piece hollow torus of flattened cross section and opened along its inner central surface for ingress and egress of air, wherein the member has driving lugs at its end portions, or is devoid of driving lugs but is employed to expand an expandable driving sleeve having end-located driving lugs.

BACKGROUND OF THE INVENTION

Field of Invention

This invention relates to pneumatic chucks or shafts to support and have a driving relationship with an article of commerce such as a roll of paper or other material.

Prior Art

In prior pneumatic chucks utilizing an expandable driving elastomer member, such member must be formed of two or more pieces and joined together, because the member comprises a solid surface hollow torus of flattened cross section. Also, the driving lugs have been provided as an integral part of the elastomer member and thus must be of the same material and of the same durometer.

SUMMARY OF THE INVENTION

One form of the inventive pneumatic chuck includes an expandable, one-piece, integral, elastomer, air-expanded, lug-equipped driving member of hollow torus form, which is open along a central inner portion thereof for ingress and egress of air. In another form, the expandable member is devoid of driving lugs and transmits no driving force from the chuck body to the article of commerce being supported, and instead a separate expandable driving sleeve is provided around the expandable member and carries the entire driving forces from the chuck body to the article of commerce, but is not required to contain and confine air under pressure and hence can be formed of other material or higher durometer material.

BRIEF DESCRIPTION OF DRAWINGS

FIG. 1 is a perspective view showing two pneumatic chucks of the present invention mounted on a shaft and supporting an article of commerce, the latter being shown in phantom lines;

FIG. 2 is a side view of the right hand chuck in FIG. 1, with the upper portion thereof being sectioned back to the vertical midplane thereof as indicated by the arrows 2—2 in FIG. 1;

FIG. 2A is a fragmentary sectional view showing a modified form of the invention;

FIG. 3 is a fragmentary perspective view showing a modified form of driving sleeve;

FIG. 4 is a fragmentary perspective view showing a still further modified form of driving sleeve;

FIG. 5 is a side view of another form of pneumatic chuck of the present invention;

FIG. 6 is an end view of the expandable elastomer member of the chuck of FIG. 5;

FIG. 7 is a sectional view taken along line 7—7 of FIG. 6;

FIG. 8 is a fragmentary sectional view showing a further modified form of chuck;

FIG. 9 is a side view of a pneumatic shaft employing expandable driving members like those in FIGS. 6 and 7, with parts broken back to a vertical midplane; and FIG. 10 is a fragmentary midsectional view through still another modified form of chuck.

FIG. 1 shows two chucks 13 and 15 of the present invention with the bodies thereof formed to fit on a shaft 11 but the chuck bodies could be otherwise formed for mounting in other ways, for instance as shown in Pat. 3,097,808 to Williams. In FIG. 1, the chucks support an article of commerce such as a paper roll 17 having a central passage 19 within which the chucks 13 and 15 slidably fit. The passage 19 in the paper rolls is in many instances defined by the interior surface of a core about which the paper is wrapped. Instead of a roll of paper, rolls of other material, or any other article of commerce formed so that it could be chuck supported could be supported by chucks 13 and 15.

Chucks 13 and 15 are generally of similar construction, the differences residing in structure by which chuck 13 is held in a fixed positon on shaft 11, while chuck 15, lacking such structure, is held in position only by its frictional contact with the roll 17.

Chuck 15 will be described first and in the form it is shown in FIGS. 1 and 2 it has a two-piece body, while in FIG. 2A it has a one-piece body. The main difference between the one and two -piece versions is that the one-piece costs less than the two-piece but there is no essential difference in performance of the finished chuck.

Referring to FIG. 2, the body of the chuck comprises a tubular member 21 and a stop ring 23 which constitute major and minor portions, respectively, of the body. The stop ring slidably fits on a projecting cylindrical mounting portion 25 formed on the main body portion 21, and abuts against a shoulder 27 provided by such main body portion. The stop ring 23 is secured in place by one or more roll pins, one, 29, being shown in FIG. 2, each roll pin having a press fit in aligned bores in the stop ring and mounting portion 25, the bores for the pin 29 in FIG. 2 being identified by the reference numerals 31 and 33.

The body 21–23 has a key slot to receive a key 34 on shaft 11 to prevent rotation of the chuck on the shaft. The shaft 11 could be made of square or other non-circular cross section, in which case the key would not be required.

The body 21–23 is formed with a wide annular groove 35 on which fits an expandable, elastomer, annular member 37. Around the member 37 is an expandable driving sleeve 39 which is crenelated at its opposite ends to provide alternating driving lugs 41 and lug receiving grooves 43, the lugs 41 fitting in mating grooves 45 on the stop ring or main body portion, with whichever part they are associated, the grooves 43 accommodating lugs 47 provided on the stop ring 23 or main body portion 21 depending on with which member the end of the driving sleeve is associated.

The lugs 41 and 47 slidably engage one another in a radial direction so that upon expansion of the member 37, the driving sleeve 39 may expand radially from end to end toward the paper roll (or other article of commerce) within which it fits.

The function of the driving sleeve 39 is to transmit torque from the shaft 11 via the chuck body 21–23 to the roll 17. Hence it preferably is of a higher durometer material than that of the expandable member 37 and preferably has greater wear resistance. It may be made for instance of polyurethane. The sole purpose of the member 37 is to expand the driving sleeve and cause frictional engagement between it and the roll 17. The expandable member 37 transmtis no driving thrust or force from the shaft 11, or from the chuck body 21–23 to the roll 17.

The main body portion is formed with an annular rib or rim 51 to abut against the roll 17 to properly locate the chuck 15 relative to the roll.

The annular elastomer expandable member 37 in cross section comprises an outer wall 61 (FIG. 2), end walls 63 and inwardly extending inner wall portions 65 which are tapered inwardly to terminate in flexible lips 67. The inner wall portions 65 and lips 67 lie against the cylindrical surface 69, which forms the bottom of a wide central groove and terminates short of a central dimple or recess 71 formed in the main body portion 21. A generally axial air supply passage 73 is formed in the main body portion and leads from the dimple 71 to one of a number of circumferentially located recesses 75 (FIG. 1) in the main body portion. An air valve stem 77 threads into the outer end of the passage 73 whereby air under pressure can be supplied to and retained within the interior of the expandable member 37 to expand it, the lips 67 being held by such pressure in sealed engagement with the cylindrical surface 69 while the outer wall is expanded outwardly whereby to expand the driving sleeve 39 into frictional gripping engagement with the roll 17.

Chuck 13 is of the same construction as chuck 15 except that at its outer end it is provided with a split collar clamp generally like that in one of the chucks in the Williams et al. Pat. 3,108,757. The clamp includes a first portion 81 integral with the main body portion of the chuck 13 and a separate clamping piece 83 which is like piece 81 but differing in that it is a separate piece from the main body portion. A pair of bolts, one 85 of which is shown, clamps pieces 81 and 83 toward one another and against the shaft 11 to releasably hold chuck 13 in a desired fixed position along shaft 11.

Instead of a split clamp 81–83, a plain collar could be provided and held in place by one or more set screws.

Chuck **15*a* in FIG. 2A is identical to chuck 15 except that the body 22 thereof is of one-piece rather than two-piece construction. Chuck 13 could have its body formed like that of chuck 15*a*** if desired.

FIG. 3 shows a modified driving sleeve **39*a* having crenelated end portions to provide spaced driving lugs 41*a* and lug receiving grooves 43*a*. The outer surface of driving sleeve 39*a* is slit or grooved in an axial direction by means of plural slits 91 so as to provide plural separate essentially contiguous ribs 92 to achieve a better gripping action than provided by the plain surface of driving sleeve 39**.

FIG. 4 shows another modified driving sleeve **39*b* having crenelated ends and being formed with axially extending T-shaped slots to accommodate rigid T-shaped strips 94 to reinforce the driving lugs 41*b* and achieve a high circumferential thrust capacity for the lugs. The T-shaped strips are independent of one another and hence do not preclude radial expansion of the sleeve 39*b***. The heads of the T-shaped strips act as retaining means. The T heads are one form of retaining means, such retaining means being necessary when the strips are exposed at the surface of the driving sleeve. In the event the strips are buried (totally embedded) in the driving sleeve, they need have no particular cross sectional shape and they may assume any desired form.

FIG. 5 shows a modified form of chuck 119 having a body comprising as primary parts an outer tubular member 121, an inner tubular member 123 and an expandable friction member 125. The outer tubular member has a large diameter stop portion 127 which slidably fits on the shaft 111 in abutting relation to the roll 17, and an inwardly projecting smaller diameter portion 129 which fits in the hole in the roll 17. Outer tubular member 121 is counterbored to telescopically receive the outer end portion of the inner tubular member 123, such portion being in the form of a sleeve 131 which is integrally joined to a larger diameter ring 133, member 123 slidably fitting on the shaft 111 but being held in a desired position by one or more set screws 134. Member 123 could be made in two parts, a sleeve 131 and a collar 133 fitting on and set screwed to the sleeve. The advantage of this construction is that when it is desired to service the expandable member 125, the collar can be removed from the sleeve to facilitate inward removal of the expandable friction member 125 whereby the outer end of the sleeve can remain secured to the outer tubular member 121 thereby avoiding disturbing the seal between such member and the sleeve. In such a construction, the outer O-ring 151 could be dispensed with and the sleeve made to have a sealed press fit in outer member 121.

The stop portion 127 is recessed to accommodate a semi-circular clamp member 135 which is secured by a pair of bolts, (one, 136, being shown in FIG. 5) to opposed faces (one, 137, being shown) on the stop portion 127, to clamp the outer tubular member in a desired fixed position on shaft 111.

The expendable friction member 125 is of the same basic construction as the expandable member 37 except that the opposite end walls of member 125 are crenelated as shown in FIGS. 5, 6 and 7 to provide alternating driving lugs 138 and lug receiving recesses or slots 139, lugs 138 fitting in complementary slots 140 (FIG. 5) formed in members 123 and 127, and slots 139 accommodating complementary lugs 141 formed on members 123 and 127.

Air under pressure is supplied to and retained in the expandable friction member 125 by a valve stem 142. The latter is disposed within an inclined recess 143 formed in the member 121 and threads into a passage 145 which leads from the stem 141 to a tube 147 recessed within the outer surface of the sleeve 131. The tube terminates at a place between the opposed inner lips 149 on the expandable member 125.

The tube 147 fills the groove in the sleeve within which it fits, or a filler is provided to fill said grove so that the lips 149 form an effective seal against the exterior surface of the sleeve 131. O-rings 151 on the opposite sides of the passage 145 prevent the loss of air which might otherwise escape by travel axially between the opposite surfaces of the sleeve 131 and the member 121.

In a smaller sized device of the type shown in FIG. 5, the body members 123 and 121 could be formed as a one-piece body, and the expandable member expanded and slipped over the raised inner ring portion of such body.

The shaft 111 could be formed as a hollow member as shown in FIG. 8, so that the expandable gripping member **125*a* can fit directly on the shaft 111*a* and driving engagement with the shaft established by an inner stop ring 161 and an outer stop ring 163 fixed by set screws or other means on the shaft and crenelated to mate with crenelated ends of the expandable member 125*a*. In such case the shaft would be formed with radial holes 165** to establish communication between the interior of the expandable member and the interior of the shaft, air under pressure being supplied through a valve stem (not shown) on the shaft to the interior of the shaft.

FIG. 7 shows a preferred form of expandable gripping member 125 in its free position. It is evident that the lip portions 149 taper radially inwardly so that the inner diameter X of the lips 149 is less than the diameter of the shaft on which it fits, such diameter being equal to dimension W. This means that the lips 149 are stretched when mounted in place and thus they grip the structure on which they are mounted to form an effective seal therewith, which is augmented by the air pressure subsequently supplied to the interior of the expandable member.

In addition, in its free unrestrained form, the member 125 has its end walls 181 tapering axially inwardly from the inner edges thereof to the outer edges as indicated by the distances Z and Y, and the outer wall 183 of the member 125 is concave. This means that as the member 125 expands, there will be a lesser tendency for the lugs 138 to pull away from the slots within which they fit, whereas when the outer wall is straight and the lugs 138 upright rather than inclined, there is a tendency upon expansion of the member for the outer wall to pull the lugs 138 axially inwardly and lessen their area of contact with the walls of the slots within which they fit.

FIG. 9 shows an expandable shaft unit utilizing plural expandable members **225*a*, 225*b* and 225*c* having crenelated ends to mate with crenelated portions provided on stop rings 227 and 229*a*, 229*b*, and 229*c*. Set screws may be employed to hold the rings in place, one, 231, of which is shown in FIG. 9 for ring 227. The shaft 233 is hollow and is formed with radial holes 235 to place the interior passage 237 of shaft 233** in communication with the interior of the expandable gripping members.

A tubular insert piece 241 is permanently secured in sealed relation in passage 237 and has a valve fitting or stem 243 threaded in the outer end thereof whereby air under pressure may be supplied to and retained in the expandable members **225*a***, *b* and *c*. The article of commerce within which the shaft unit fits is not shown in FIG. 9.

FIG. 10 shows a chuck wherein the body 321 is formed with plural circumferentially spaced, axially extending blind recesses 333 at each side of the driving sleeve 335 to slidably receive the ends of plural limit pins 337 which are circumferentially distributed about the driving sleeve. The pins 337 transmit the driving torque from the body 321 to the driving sleeve 335. the radial dimension of the recesses is larger than the corresponding dimension of the associated pins so that an expandable member 338 can expand the elastomer driving sleeve outwardly until the pins 337 contact the surface portions of the body 321 which defines the outer ends of the recesses 333. This arrangement provides for limited expansion of the driving sleeve to provide a known fixed expanded diameter of the sleeve. Sheet or strip material can then be wound directly onto the expanded driving sleeve, without use of a core, to build up a roll on the expanded driving sleeve. Thereafter the chuck can be deflated and removed from the roll leaving a hole of predetermined diameter for subsequent operation.

The term chuck or chuck device as used in the claims means either a chucking shaft, such as shown in FIG. 9, or the shorter chucking devices, such as shown in other of the figures, such as FIG. 5.

Having described the invention in what is believed to be the preferred embodiment thereof, it is desired that it be understood that the invention is not to be limited other than by the provisions of the following claims.

We claim:

1. A pneumatic chuck to loosely fit into a recess of an article of commerce thereafter to be expanded to establish a driving relationship with such article, said chuck comprising:

a chuck body to be driven and to occupy a position projecting into such article, an annular, inflatable expander member surrounding said body in contact therewith, means for conducting air under pressure through said body into said expander member for inflating and expanding the same radially toward such article, valve means for releasably retaining air under pressure in said expander member, an expansible driving sleeve which constitutes a member separate and distinct from said expander member and which surrounds said expander member in free contact therewith to be expanded thereby into driving engagement with such article, said sleeve having driving lugs at each end thereof, and said body having recesses defined by walls receiving said lugs whereby there is established a driving relationship from said body through said sleeve to such article in bypassing relation to said expander member, whereby said expander member is not required to transmit any of the driving force from said body to said article.

2. A pneumatic chuck for mounting a paper roll in driving relationship to a shaft which extends through the core of the roll, said chuck comprising:

hub means mountable in non-rotative fashion on the shaft and in supporting relation to the core of the paper roll, an annular, inflatable expander member surrounding said hub means, means for conducting air under pressure through said hub means to said expander member for inflating and expanding the same radially toward said core, valve means for releasably retaining air under pressure in said expander member, an expansible driving sleeve which constitutes a member separate and distintc from said expander member and which surrounds said expander member in free contact therewith to be expanded thereby into driving engagement with the core of the paper roll, and means carried solely by said sleeve and hub and establishing a driving relationship between said hub and sleeve in bypassing relation to said expander member, the last named means providing for radial play between said sleeve and hub means to facilitate expansion of the sleeve relative to the hub means.

3. An air-expanded friction member comprising:

a one-piece, integral, unitary, molded, hollow, elastomer torus of flattened cross section defined by an outer wall, end walls and inner wall portions extending generally axially inwardly from said end walls, said end walls being crenelated for mating driving engagement with crenelated portions of a rigid supporting body on which the friction member is adapted to fit, said outer wall being concave and the end walls converging outwardly toward one another and said inner wall portions extending toward one another but each being acutely angularly related to the axis of said friction member.

4. A pneumatic chuck as set forth in claim 1, wherein the driving lugs for said driving sleeve are provided by rigid pins extending through said driving sleeve.

5. A pneumatic chuck as set forth in claim 4, wherein said recesses in said body terminate short of the peripheral surface of said body whereby to limit expansion of said friction member.

6. A pneumatic chuck to fit loosely into an opening in another article, said chuck comprising:

a chuck body having a central groove defined by a pair of spaced annular ribs and a smooth cylindrical surface between said birs wherein said smooth cylindrical surface is unbroken save by a centrally located air passageway, a unitary one-piece molded elastomer expandable driving element comprising a hollow torus of flattened cross section which is open at least at one place on its inner wall and centrally thereof to establish communication between said air passageway and the interior of said driving element, said inner wall forming a seal against said cylindrical surface around the opening in said inner wall, said element having integral lugs at its ends for mating engagement in lug recesses provided in said ribs, said inner wall being at least in part of smaller diameter than said cylindrical surface in the undistorted form of said element so that said inner wall will be stretched and have tensioned gripping contact with said cylindrical surface to form a seal therewith when said element is mounted on said body.

7. A pneumatic chuck to fit loosely into an opening in another article, said chuck comprising:

a chuck body having a central groove defined by a pair of spaced annular ribs and a smooth cylindrical surface between said ribs wherein said smooth cylindrical surface is unbroken save by a centrally located air passageway, a unitary one-piece molded elastomer expandable driving element comprising a hollow torus of flattened cross section which is open at least at one place on its inner wall and centrally thereof to establish communication between said air passageway and the interior of said driving element, said inner wall forming a seal against said cylindrical surface around the opening in said inner wall, said element having integral lugs at its ends for mating engagement in lug recesses provided in said ribs, the outer wall of said element being concave in the free undistorted form of said element and said lugs being inclined upwardly and outwardly whereby expansion of said element has a lesser tendency to pull the lugs away from said recesses than otherwise would be the case.

8. A pneumatic chucking device for a shaft, comprising:

first and second rigid annular members having means for securing them on the shaft, said members providing opposed spaced stop faces, an elastomer friction member of hollow torus form disposed between said stop faces, said friction member having axially extending lugs fitting in recesses in said stop faces, said friction member having an opening in its inner wall for ingress and egress of air, said first member having a reduced portion extending along the interior of said friction member and into said second member, said reduced portion having an axially extending air passageway therein for conducting air to and from said opening in the inner wall of said friction member.

9. An air expansible friction device comprising:

a pair of annular end members each of a predetermined thickness and having driving portions, a semi-flexible, expansible, sleeve-like, elastomer outer wall concave outwardly in longitudinal section and of a thickness substantially less than said predetermined thickness, and a pair of flexible, sealing, elastomer, inner sleeve portions extending toward each other from the end members, the outer wall, the end portions, the inner sleeve portions and the end members defining a generally annular chamber adapted to receive air under pressure when the device is placed on a shaft to force the inner sealing portions against the shaft and bow the outer wall outwardly into engagement with an annular article thereon.

10. The air expansible friction device of claim 9 wherein the device is integral and is of an elastomer.

11. The air expansible friction device of claim 10 wherein the inner surface of the sleeve portions taper inwardly proceeding away from the end members.

12. The air expansible friction device of claim 9 wherein the driving portions comprise lugs on the ends of the end portions.

References Cited

UNITED STATES PATENTS

| | | | |
|---|---|---|---|
| 2,134,475 | 10/1938 | Green | 242—68.2 |
| 2,697,563 | 12/1954 | Miller | 242—68.2 |
| 3,097,808 | 7/1963 | Williams | 242—68.2 |
| 3,108,757 | 10/1963 | Williams et al. | 242—68.2 |
| 3,298,626 | 1/1967 | Frick et al. | |

NATHAN LOUIS MINTZ, Primary Examiner